(12) United States Patent
Hamagishi

(10) Patent No.: US 8,717,520 B2
(45) Date of Patent: May 6, 2014

(54) THIN FILM SEMICONDUCTOR DEVICE AND METHOD FOR MANUFACTURING THIN FILM SEMICONDUCTOR DEVICE

(75) Inventor: Goro Hamagishi, Toyonaka (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 96 days.

(21) Appl. No.: 13/161,725

(22) Filed: Jun. 16, 2011

(65) Prior Publication Data

US 2011/0242466 A1    Oct. 6, 2011

Related U.S. Application Data

(63) Continuation of application No. 11/727,145, filed on Mar. 23, 2007, now Pat. No. 7,982,728.

(30) Foreign Application Priority Data

Mar. 27, 2006    (JP) .................................. 2006-085955
Mar. 27, 2006    (JP) .................................. 2006-085956

(51) Int. Cl.
*G02F 1/1333*    (2006.01)
*G06F 3/038*    (2013.01)
*G02B 27/22*    (2006.01)

(52) U.S. Cl.
USPC ............. 349/110; 345/204; 345/87; 359/464; 359/466; 359/467; 359/472; 349/8; 349/15

(58) Field of Classification Search
USPC ................................. 345/204; 349/8, 15, 110
See application file for complete search history.

(56) References Cited

U.S. PATENT DOCUMENTS 4,987,487 A * 1/1991 Ichinose et al. ................. 348/59
5,751,479 A    5/1998 Hamagishi et al.
(Continued)

FOREIGN PATENT DOCUMENTS

JP    2004-140700    5/2004
JP    2004-206089    7/2004
(Continued)

OTHER PUBLICATIONS

Japanese Office Action issued Mar. 8, 2011, corresponding to Japanese Appln. No. 2006-085955.

(Continued)

*Primary Examiner* — Bipin Shalwala
*Assistant Examiner* — Benyam Ketema
(74) *Attorney, Agent, or Firm* — K&L Gates LLP

(57) ABSTRACT

In a display device that provides a first observation region with a first picture and provides a second observation region with a second picture, a double image made of the first picture and the second picture is suppressed. First columns of pixels that display the first picture and second columns of pixels that display the second picture are disposed alternately with a black matrix interposed between each neighboring pair of them. A light-shielding plate having light-shielding portions and openings is disposed above the panel. When a distance between the first observation region and the second observation region is denoted by V, a distance between the first observation region or the second observation region and the light-shielding plate is denoted by D, a distance between the light-shielding plate and the display panel is denoted by G, an interval of the first columns of pixels or the second columns of pixels is denoted by P, and the width of the black matrix is denoted by Q, an equation $K \leq Q \times D/(D+G)$ is satisfied. The openings are disposed on lines connecting between a position directly above a center of the display panel and the black matrix.

14 Claims, 12 Drawing Sheets

(56) References Cited

U.S. PATENT DOCUMENTS

| | | | |
|---|---|---|---|
| 6,040,807 A * | 3/2000 | Hamagishi et al. | 345/6 |
| 6,049,424 A * | 4/2000 | Hamagishi | 359/464 |
| 6,304,288 B1 | 10/2001 | Hamagishi | |
| 6,593,904 B1 * | 7/2003 | Marz et al. | 345/87 |
| 6,710,920 B1 | 3/2004 | Mashitani et al. | |
| 6,954,185 B2 * | 10/2005 | Ogino | 345/7 |
| 7,265,902 B2 * | 9/2007 | Lee et al. | 359/463 |
| 7,583,327 B2 * | 9/2009 | Takatani | 349/15 |
| 7,609,445 B2 * | 10/2009 | Hamagishi | 359/463 |
| 7,898,602 B2 * | 3/2011 | Yabuta et al. | 349/1 |
| 2005/0052529 A1 * | 3/2005 | Mashitani et al. | 348/51 |
| 2005/0200781 A1 * | 9/2005 | Takatani | 349/122 |
| 2006/0139234 A1 * | 6/2006 | Tanaka | 345/9 |
| 2008/0084361 A1 * | 4/2008 | Ueta et al. | 345/7 |

FOREIGN PATENT DOCUMENTS

| | | |
|---|---|---|
| JP | 2005-078076 | 3/2005 |
| JP | 2005-165228 | 6/2005 |
| JP | 2005-536388 | 12/2005 |

OTHER PUBLICATIONS

Japanese Office Action issued Dec. 25, 2012 for corresponding Japanese Application No. 2006-085955.

* cited by examiner

THIN FILM SEMICONDUCTOR DEVICE AND METHOD FOR MANUFACTURING THIN FILM SEMICONDUCTOR DEVICE

CROSS REFERENCES TO RELATED APPLICATIONS

This application is a continuation of U.S. patent application Ser. No. 11/727,145, filed on Mar. 23, 2007, which claims priority to JP 2006-085955 filed on Mar. 27, 2006 and JP 2006-085956 filed on Mar. 27, 2006, the contents of which are incorporated herein by reference in their entirety.

BACKGROUND

1. Field of the Invention

This invention relates to a display device, specifically to a display device that provides a first observation region with a first picture and provides a second observation region with a second picture.

2. Description of the Related Art

A liquid crystal display device using a liquid crystal panel for display (hereafter referred to as an LCD (Liquid Crystal Display)) has been known as a display device incorporated in a TV receiver, information equipment and the like. Relating to the display devices such as the liquid crystal display device, a dual picture display that provides a first observation region with a first picture and provides a second observation region with a second picture, has come to be known, as the information equipment diversifies in recent years.

A dual picture display device according to a conventional art will be described hereafter referring to the drawings. FIG. 12 is a cross-sectional view showing the display device according the conventional art. In the display device 100, there is disposed a display panel 10 that is made of first columns of pixels 10A that display the first picture and second columns of pixels 10B that display the second picture disposed alternately, as shown in FIG. 12. The first columns of pixels 10A and the second columns of pixels 10B are made of pixels each having a liquid crystal layer, for example. There is formed a so-called black matrix 11 between neighboring pixels in the first columns of pixels 10A and the second columns of pixels 10B. A light-shielding plate 50 made of metal or resin that has a light-shielding function is disposed above the display panel 10 through a transparent substrate (not shown) such as a glass substrate. The light-shielding plate 50 is provided with light-shielding portions 51 and openings 52 disposed alternately and extending parallel to the first columns of pixels 10A and the second columns of pixels 10B.

Next, how the structure described above works to realize the dual picture display will be explained. The first observation region A, which is located to the left of a positionC directly above a center of the display panel 10, is provided with the first picture from the first columns of pixels 10A through openings 52 in the light-shielding plate 50, as shown in FIG. 12. At that time, the first observation region A is not provided with the second picture from the second columns of pixels 10B, because the light-shielding portions 51 in the light-shielding plate 50 block the second picture.

On the other hand, the second observation region B, which is located to the right of the position C directly above the center of the display panel 10, is provided with the second picture from the second columns of pixels 10B through the openings 52 in the light-shielding plate 50. At that time, the second observation region B is not provided with the first picture from the first columns of pixels 10A, because the light-shielding portions 51 in the light-shielding plate 50 block the first picture. As described above, there is performed the dual picture display in which the first observation region A is provided with the first picture and the second observation region B is provided with the second picture.

Technologies mentioned above are disclosed in Japanese Patent Application Publication No. 2005-258016.

With the dual picture display by the display device described above, however, there is caused a double image or an overlapping of the first and second pictures when the display panel 10 is observed from the position C directly above the center of the display panel 10 or its vicinity. That is, the first picture can not be distinguished from the second picture, thus a quality of the dual picture display has suffered.

SUMMARY

This invention is directed to suppress overlapping of a first picture and a second picture in a display device that provides a first observation region with the first picture and provides a second observation region with the second picture.

This invention offers a display device, which provides a first observation region with a first picture and provides a second observation region with a second picture, including a display panel in which first columns of pixels that display the first picture and second columns of pixels that display the second picture are disposed alternately with a black matrix interposed between each neighboring pair of them, and a light-shielding plate disposed above the display panel and including light-shielding portions and openings disposed alternately and extending parallel to the first columns of pixels and the second columns of pixels, wherein the following equation is satisfied:

$$K \leq Q \times D/(D+G)$$

where D is a distance between the light-shielding plate and the first observation region or the second observation region, G is a distance between the light-shielding plate and the display panel, K is a width of each of the openings and Q is a width of the black matrix. This invention also offers the display device wherein the following equation is satisfied:

$$P = G \times V/D$$

where V is a width of the first observation region or the second observation region and P is an interval of the first columns of pixels or the second columns of pixels. This invention also offers the display device wherein the light-shielding portions are disposed so that a line connecting a position directly above a center of the display panel and the black matrix goes through each of the openings.

This invention also offers a display device, which provides a first observation region with a first picture and provides a second observation region with a second picture, including a display panel in which first columns of pixels that display the first picture and second columns of pixels that display the second picture are disposed alternately and a movable barrier that is disposed above the display panel, includes light-shielding portions and transmissive portions disposed alternately and extending in parallel to the first and second columns of pixels, and is capable of changing locations of the light-shielding portions and the transmissive portions. This invention also offers the display device further including a detector that detects an orientation of the display panel and changing the locations of the light-shielding portions and the transmissive portions in the movable barrier in response to a result of detection by the detector.

Additional features and advantages are described herein, and will be apparent from, the following Detailed Description and the figures.

DETAILED DESCRIPTION

Figure 1A:
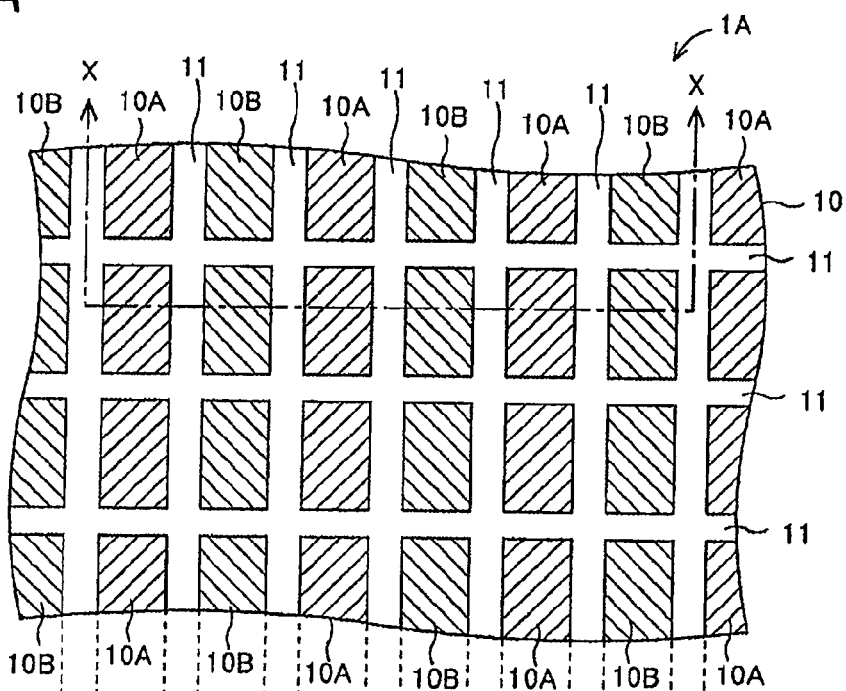
FIGS. 1A and 1B are plan views showing a display device according to an example of a first embodiment of this invention.
Figure 1B:
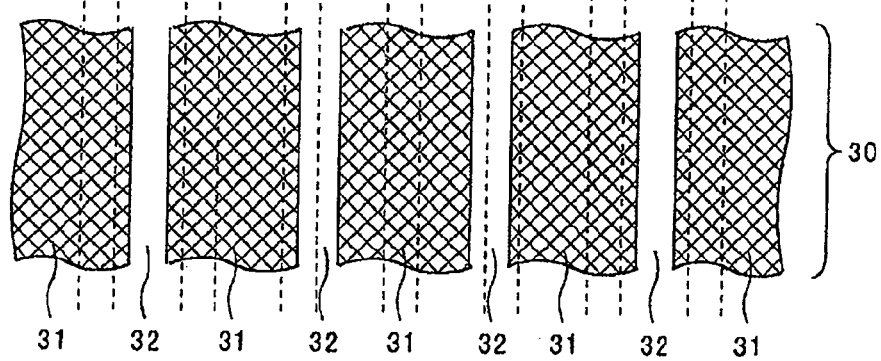
Figure 2:
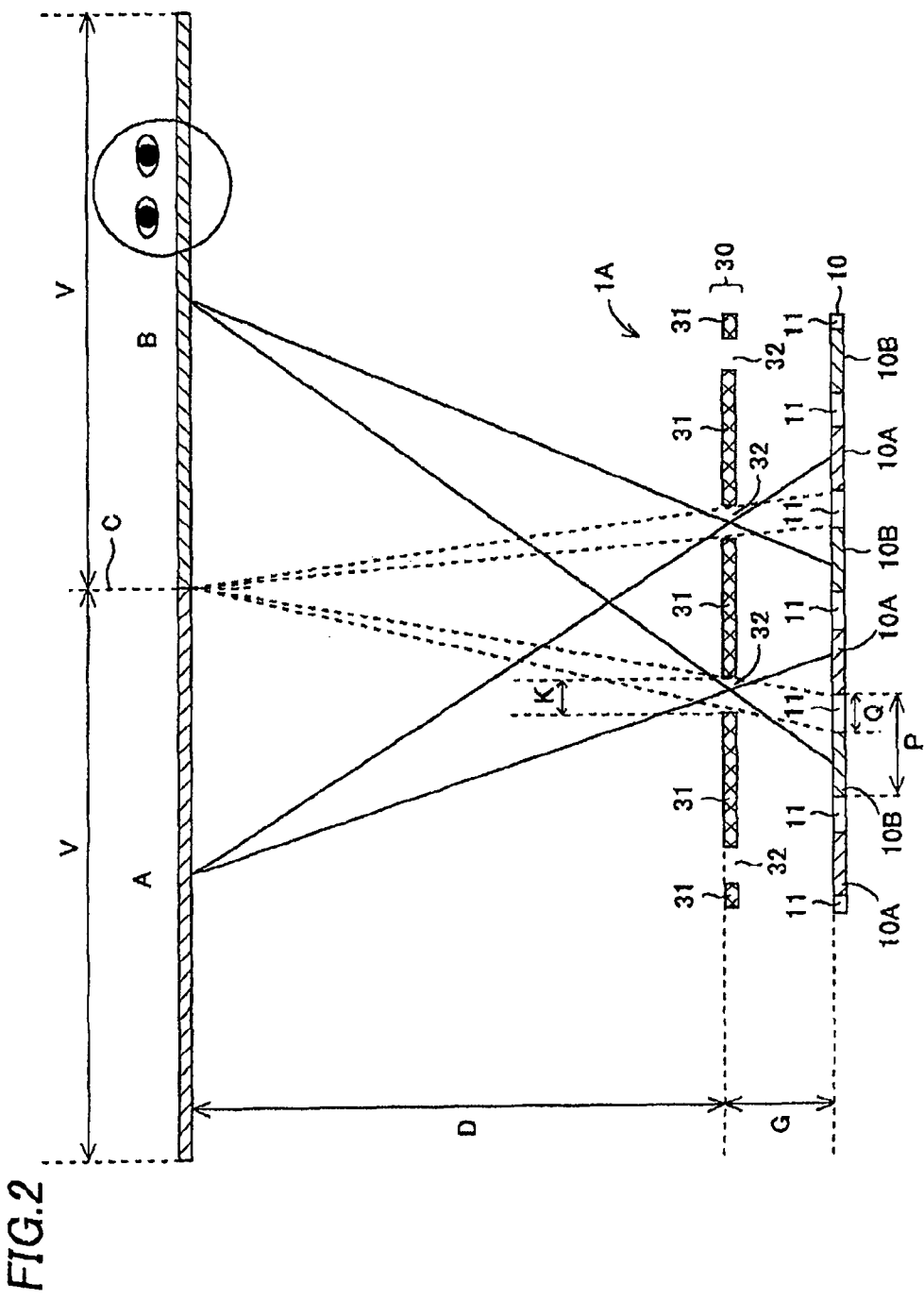
FIG. 2 is a cross-sectional view showing the display device according to the example of the first embodiment of this invention.
Figure 12:
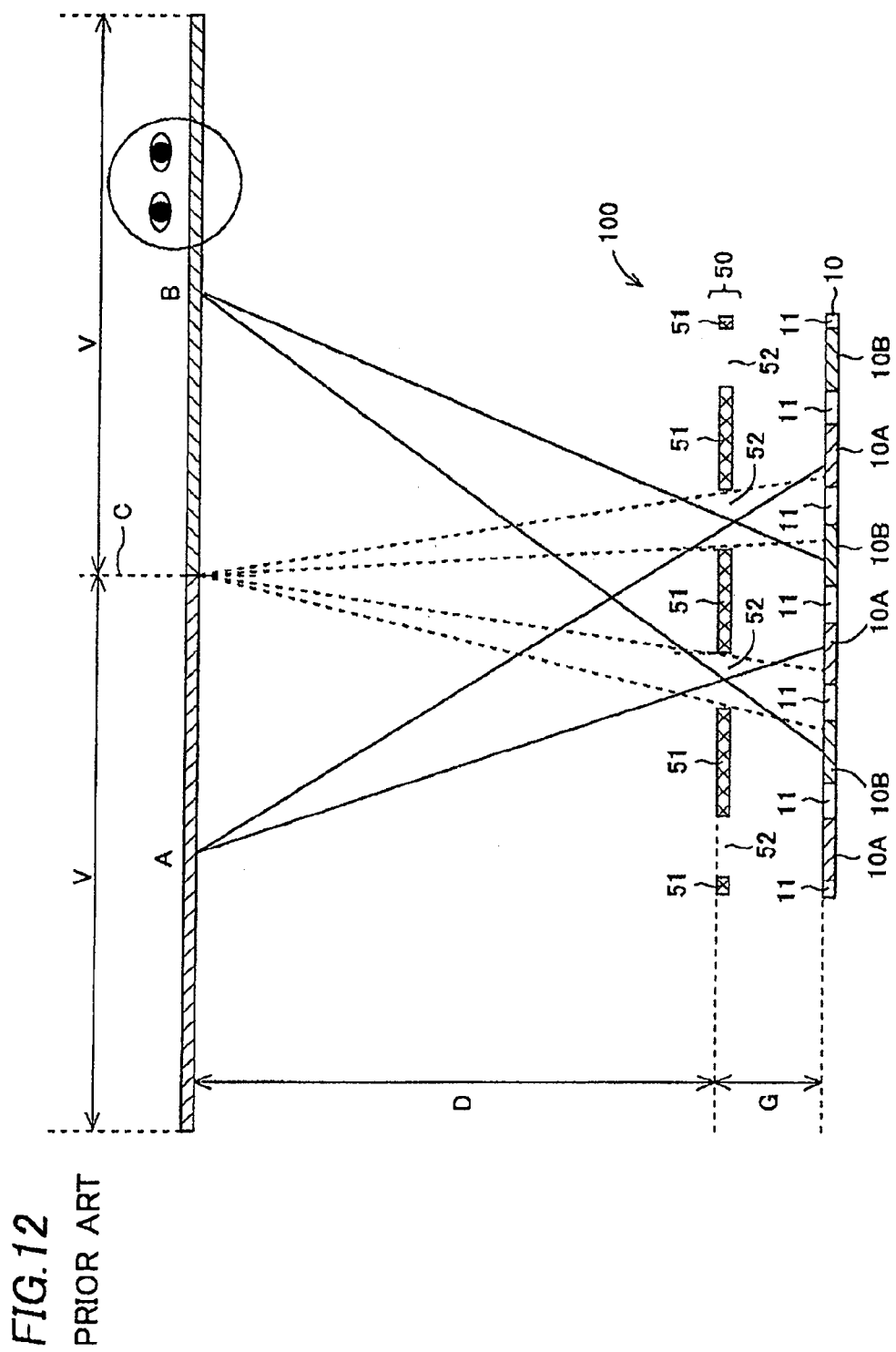
FIG. 12 is a cross-sectional view showing a display device according to a conventional art.

A display device according to an example of a first embodiment of this invention will be described hereafter referring to the drawings. FIGS. 1A and 1B are plan views showing the display device 1A according to the example of the first embodiment of this invention. FIGS. 1A and 1B show a display panel 10 and a light-shielding plate 30 overlapping with it, respectively. Both of them will be described later. FIG. 2 is a cross-sectional view showing a section X-X in FIG. 1A. That is, FIG. 2 shows a cross section that is orthogonal to first columns of pixels 10A and second columns of pixels 10B, which are to be described later. In FIGS. 1A, 1B and 2, the same components as those in FIG. 12 are denoted by the same symbols.

In the display device 1A, there is disposed the display panel 10 that is made of the first columns of pixels 10A that display a first picture and the second columns of pixels 10B that display a second picture disposed alternately, as shown in FIGS. 1A and 2. Also, there is disposed a so-called black matrix 11 between neighboring pair of the first column of pixels 10A and the second column of pixels 10B. The first columns of pixels 10A and the second columns of pixels 10B are made of pixels each having a liquid crystal layer, for example. The first columns of pixels 10A and the second columns of pixels 10B are not limited to be made of the pixels having the liquid crystal layer, and may be made of other pixels such as pixels having organic electroluminescent devices, for example, as light-emitting devices.

The light-shielding plate 30 made of a metal or a resin and having a light-shielding function is disposed above the display panel 10 through a transparent substrate (not shown) such as a glass substrate. The light-shielding plate 30 is provided with light-shielding portions 31 and openings 32 disposed alternately and extending parallel to the first columns of pixels 10A and the second columns of pixels 10B.

A first observation region A, which is located to the left of a position C directly above a center of the display panel 10, is provided with the first picture, while a second observation region B is located to the right of the position C directly above the center of the display panel 10. The position C directly above the center of the display panel 10 means a position on a line perpendicular to a plane parallel to the display panel 10 and intersecting a line dividing approximately equally the display panel 10 in a direction perpendicular to the first columns of pixels 10A and the second columns of pixels 10B and its vicinity.

Next, detailed structures of the display panel 10 and the light-shielding plate 30 will be described. Each of the light-shielding portions 31 in the light shielding plate 30 are disposed in a way that each of lines connecting between the position C directly above the center of the display panel 10 and the black matrix 11 goes through corresponding each of the openings 32.

A distance between the light-shielding plate 30 and either the first observation region A or the second observation region B is denoted by D. In this embodiment, this distance D is about 650 mm. A distance between the light-shielding plate 30 and the display panel 10 is denoted by G. A width of the opening 32 in the light-shielding plate 30 is denoted by K, and a width of the black matrix 11 in the display panel 10 is denoted by Q. In this case, the display panel 10 and the light-shielding plate 30 are formed so as to satisfy the following equation (1):

$$K \leq Q \times D/(D+G) \tag{1}$$

This equation (1) represents a condition that only the black matrix 11 is observed through the openings 32 in the light-shielding plate 30 at the position C directly above the center of the display panel 10 to display black.

However, if the width K of the opening 32 is decided to be extremely small, brightness of each of the first and second pictures looked at each of the first and second observation regions A and B, respectively, would be too low to recognize the picture. Therefore, in this embodiment the minimum value of the width K of the opening 32 is decided so as to make the brightness high enough to cause no problem to recognize each of the first and second pictures at each of the first and second observation regions A and B.

Figure 3:
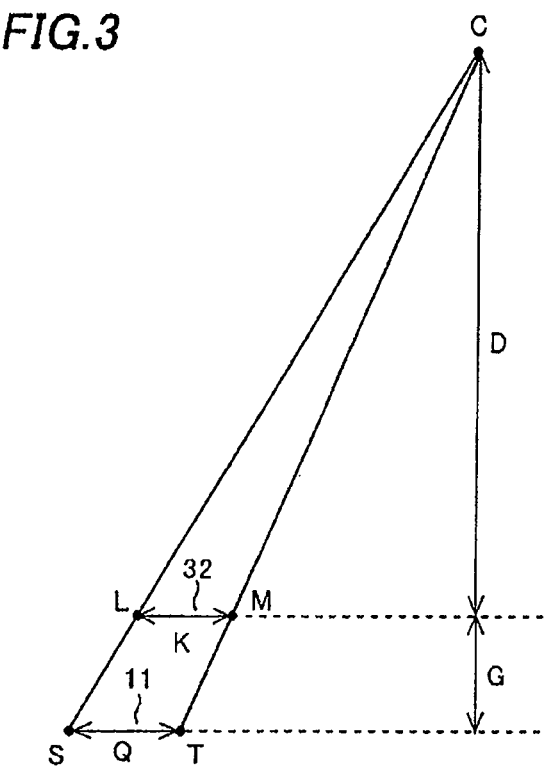
FIG. 3 is a conceptual drawing showing positioning relationship between a black matrix in a display panel and an opening in a light-shielding plate shown in FIG. 2.

Next, how the equation (1) is derived is explained referring to the drawings. FIG. 3 is a conceptual drawing showing positioning relationship between the black matrix 11 in the display panel 10 and the opening 32 in the light-shielding plate 30 shown in FIG. 2.

There is defined a triangle CLM (hereafter referred to as $\triangle$CLM) having the width K of the opening 32 as a base and the position C as an apex opposite to the base, as shown in FIG. 3. Also, there is defined a triangle CST (hereafter referred to as $\triangle$CST) having the width Q of the black matrix 11 as a base and the position C as an apex opposite to the base.

In order that only the black matrix 11 is observed through the opening 32 at the position C directly above the center of the display panel 10, the width K of the opening 32 must take a value that makes the triangles ΔCLM and ΔCST geometrically similar to each other or the less. In the case where the triangles ΔCLM and ΔCST are geometrically similar to each other, a ratio of the width Q to the width K is equal to a ratio of a length of a side CS to a length of a side CL. At that time, the ratio of the length of the side CS to the length of the side CL is also equal to a ratio of a sum of the distance D and the distance G to the distance D. That is, when the triangles ΔCLM and ΔCST are geometrically similar to each other, an equation (2) is derived:

$$K{:}Q=D{:}(D+G) \qquad (2)$$

The value of the width K is obtained based on the equation (2). A range of the width K in which K is equal to or less than the obtained value is expressed by the equation (1).

When a width of the first observation region A and the second observation region B is denoted by V and a pitch that is an interval of the first columns of pixels 10A as well as the second columns of pixels 10B is denoted by P as shown in FIG. 2, the display panel 10 is formed so as to satisfy a following equation (3):

$$P=G{\times}V/D \qquad (3)$$

The equation (3) is derived from a geometrical relationship represented by an equation (4):

$$P{:}V=G{:}D \qquad (4)$$

Next, how the structure described above works to realize the dual picture display will be explained referring to the drawings. Neither the first picture in the first columns of pixels 10A nor the second picture in the second columns of pixels 10B is provided to the position C directly above the center of the display panel 10 because both pictures are shielded by the light-shielding portions 31, as shown in FIG. 2. That is, because only the black matrix 11 is observed at the position C directly above the center of the display panel 10, black is displayed. This is because the lines connecting the position C directly above the center of the display panel 10 and the black matrix 11 goes through the openings 32 and because the equation (1) is satisfied. Although not shown in the figure, when a left hand side of the equation (1), i.e. the width K of the opening 32, is smaller than a right hand side of the equation (1), that is, when both sides of the equation (1) are not equal to each other, the region where black is displayed exists not only at the position C directly above the center of the display The first picture is provided to the first observation region A from the first columns of pixels 10A through the openings 32 based on the relationship of the equation (3). At that time, the first observation region A is not provided with the second picture displayed by the second columns of pixels 10B, because the second picture is blocked by the light-shielding portions 31.

On the other hand, the second picture is provided to the second observation region B from the second columns of pixels 10B through the openings 32 based on the relationship of the equation (3). At that time, the second observation region B is not provided with the first picture displayed by the first columns of pixels 10A, because the first picture is blocked by the light-shielding portions 31.

As described above, while the dual picture display is realized with the display panel 10, the double image that is overlapping of the first picture and the second picture as observed with the conventional art can be suppressed at the position C directly above the center of the display panel 10 and in its vicinity. As a result, the quality of the dual picture display can be improved compared with the conventional art.

Figure 4A:
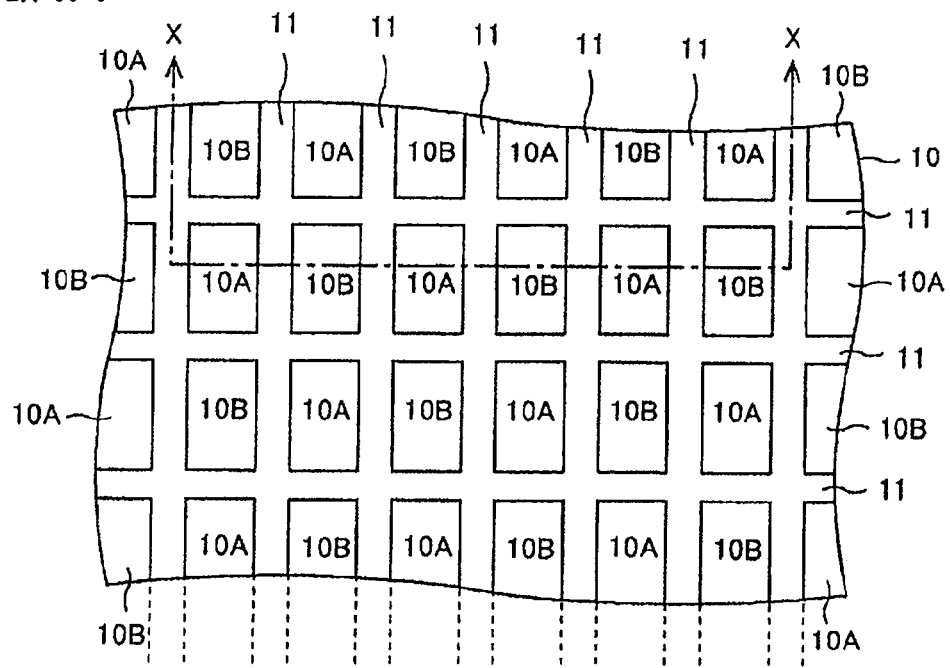
FIGS. 4A and 4B are plan views showing a display device according to another example of the first embodiment of this invention.
Figure 4B:
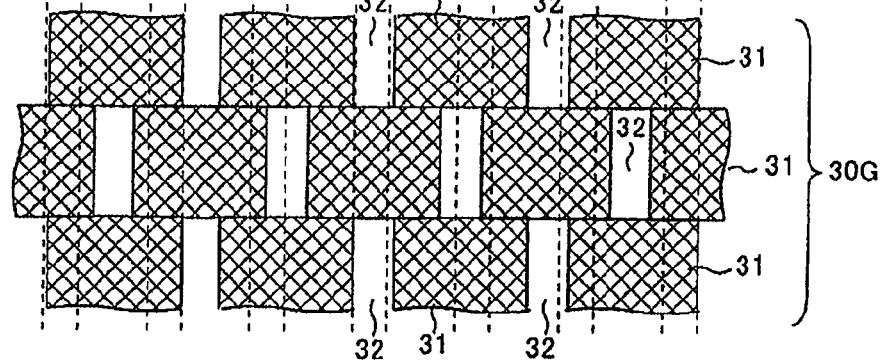

The display panel 10 and the light-shielding plate 30 in the embodiment is not limited to the structure described above, and may be disposed as described below as long as it is as effective as described above. FIGS. 4A and 4B are plan views showing a display device according to another example of the first embodiment of this invention. FIGS. 4A and 4B show a display panel 10 and a light-shielding plate 30 overlapping with it, respectively.

Figure 5A:
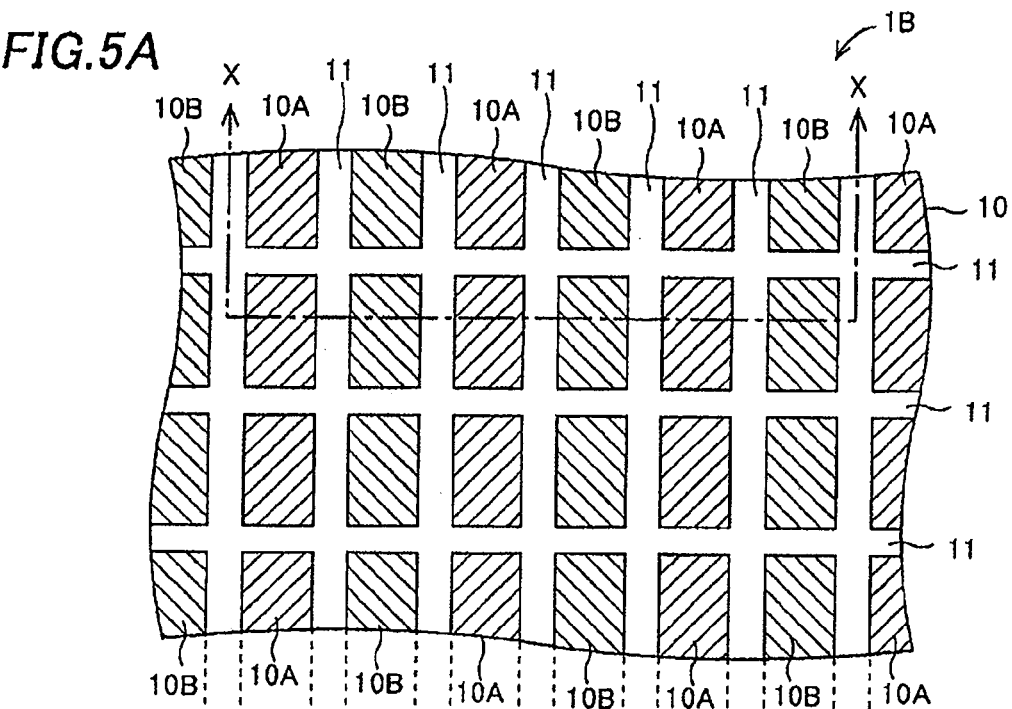
FIGS. 5A and 5B are plan views showing a display device according to an example of a second embodiment of this invention.
Figure 5B:
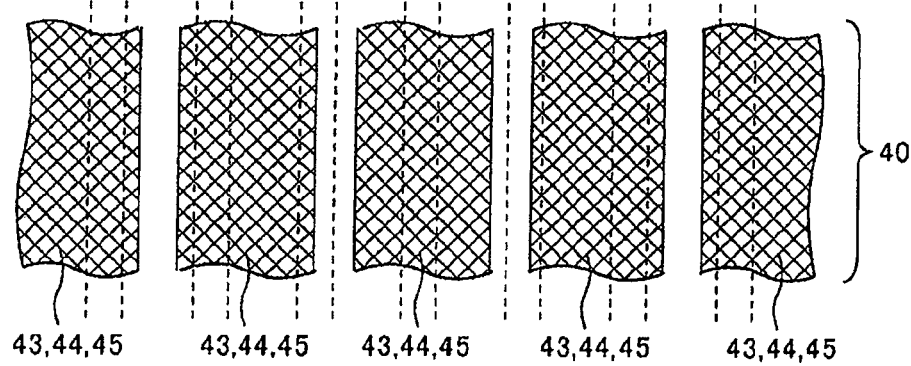
Figure 6:
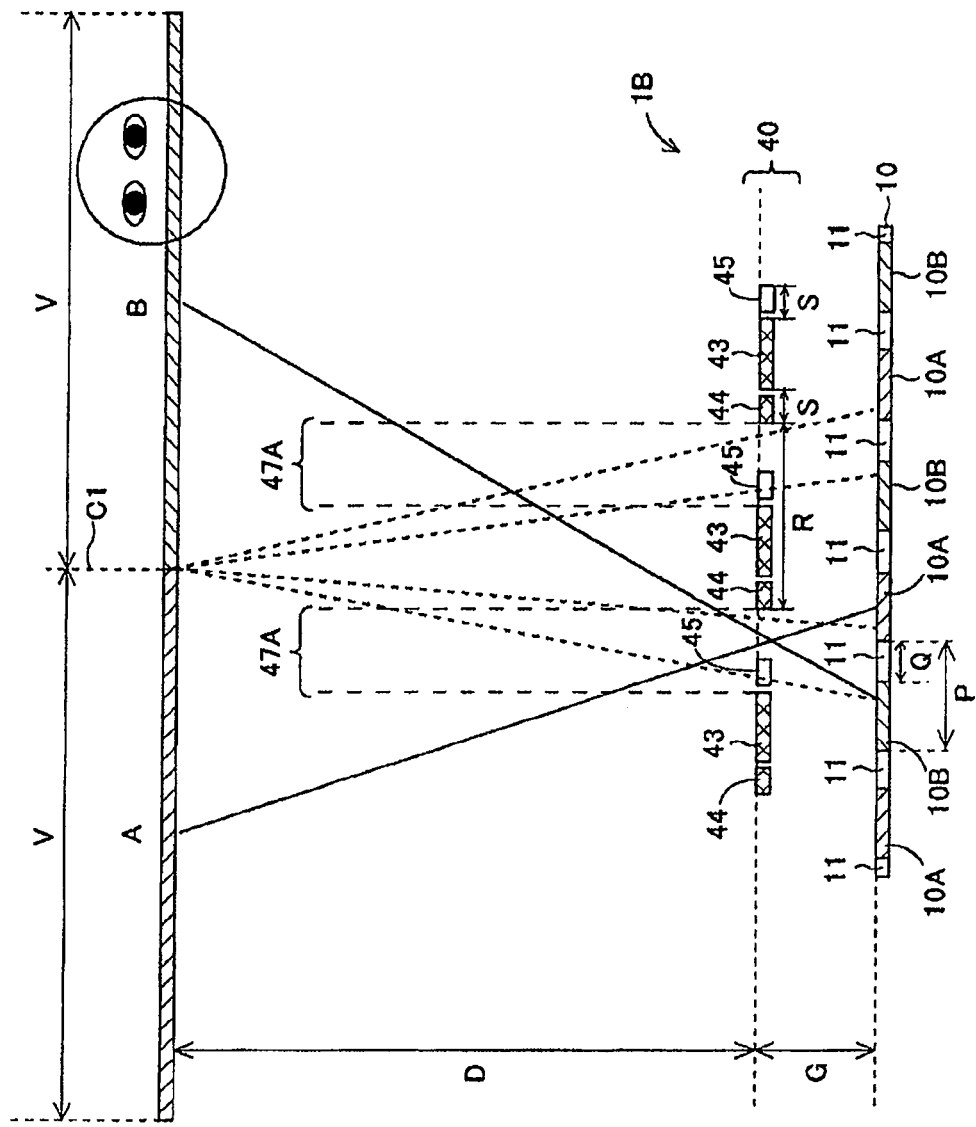
FIG. 6 is a cross-sectional view showing the display device according to the example of the second embodiment of this invention.

Pixels in the first columns of pixels 10A and pixels in the second columns of pixels 10B may be disposed alternately in every row and column, as shown in FIG. 4A. In this case, the light-shielding portions 31 and the openings 32 in the light-shielding plate 30G may be divided corresponding to the pixels in the first columns of pixels 10A and the pixels in the second columns of pixels 10B and disposed alternately in every row and column, as shown in FIG. 4B. Visibility of the dual picture can be thereby further improved because there are the first and second Next, a display device according to an example of a second embodiment of this invention will be described hereafter referring to the drawings. FIGS. 5A and 5B are plan views showing the display device 1B according to the example of the second embodiment of this invention. FIGS. 5A and 5B show a display panel 10 and a movable barrier 40 overlapping with it, respectively. Both of them will be described later. FIG. 6 is a cross-sectional view showing a section X-X in FIG. 5A. That is, FIG. 6 shows a cross section that is orthogonal to first columns of pixels 10A and second columns of pixels 10B, which are to be described later. FIG. 6 shows a case in which locations of transmissive portions in the movable barrier 40 are in a first state that is to be described later. In FIGS. 5A, 5B and 6, the same components as those in FIG. 12 are denoted by the same symbols.

In the display device 1B, there is disposed the display panel 10 made of the first columns of pixels 10A, which display a first picture, and the second columns of pixels 10B, which display a second picture, disposed alternately as shown in FIGS. 5A and 6. Also, there is disposed a so-called black matrix 11 between neighboring pair of the first column of pixels 10A and the second column of pixels 10B. The first columns of pixels 10A and the second columns of pixels 10B are made of pixels each having a liquid crystal layer, for example. The first columns of pixels 10A and the second columns of pixels 10B are not limited to be made of the pixels having the liquid crystal layer, and may be made of other pixels such as pixels having organic electroluminescent devices, for example, as light-emitting devices.

A first observation region A, that is provided with the first picture, is located to the left of a position C1 directly above a center of the display panel 10, while a second observation region B, that is provided with the second picture, is located to the right of the position C1 directly above the center of the display panel 10. The position C1 directly above the center of the display panel 10 means a position on a line perpendicular to a plane parallel to the display panel 10 and intersecting a line approximately equally dividing the display panel 10 in a direction perpendicular to the first columns of pixels 10A and the second columns of pixels 10B and its vicinity.

Between the display panel 10 and the first and second observation regions A and B, a movable barrier 40 is disposed above the display panel 10 through a transparent substrate such as a glass substrate (not shown). The movable barrier 40 has light-shielding portions and transmissive portions disposed alternately and extending in parallel to the first columns of pixels 10A and the second columns of pixels 10B. The movable barrier 40 is capable of changing locations of the light-shielding portions and the transmissive portions, as will be described later. The first observation region A and the second observation region B can be moved by changing the locations of the transmissive portions in the movable barrier 40.

Figure 7A:
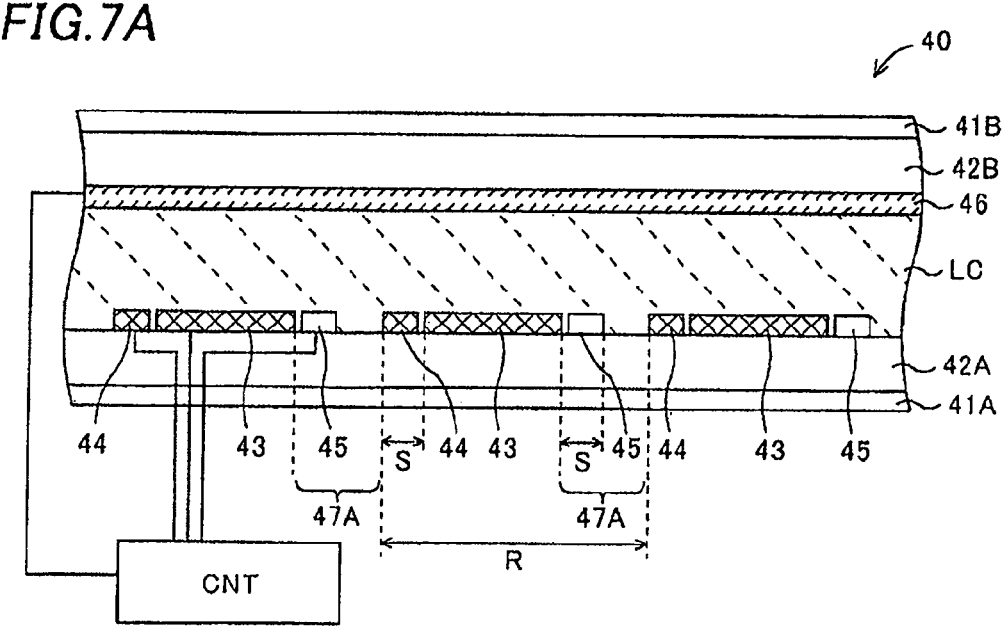
FIGS. 7A and 7B are cross-sectional views showing the display device according to the example of the second embodiment of this invention.
Figure 7B:
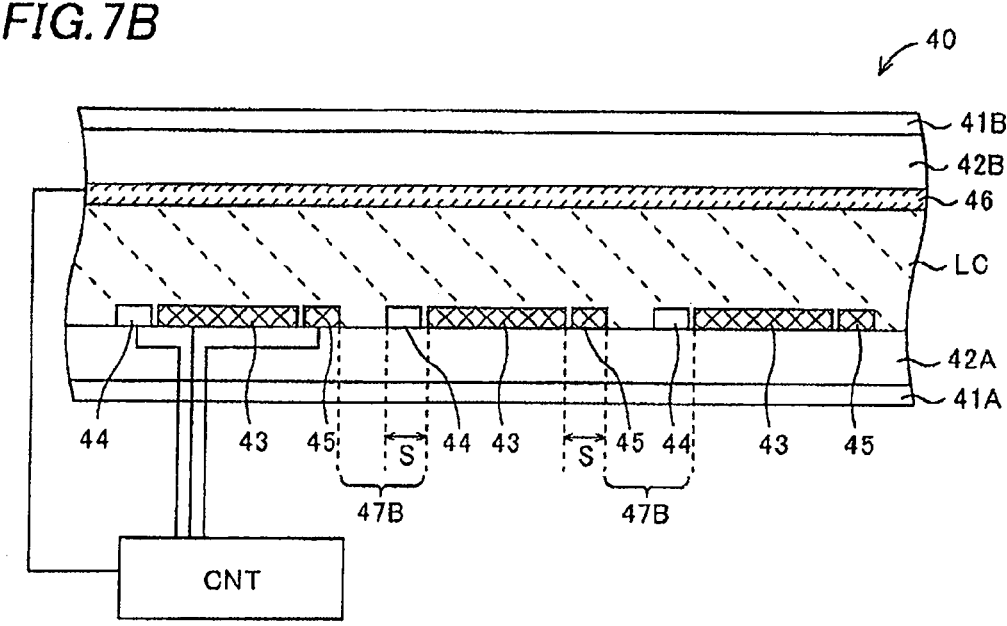

A structure of the movable barrier 40 will be described hereafter, referring to the drawings. FIGS. 7A and 7B are magnified cross-sectional views of the movable barrier 40 shown in FIG. 6. FIG. 7A shows the case in which the locations of the transmissive portions in the movable barrier 40 are in the first state, while FIG. 7B shows a case in which the locations of the transmissive portions in the movable barrier 40 are in a second state.

The movable barrier 40 is a liquid crystal barrier made of a first transparent substrate 42A having a first polarizing plate 41A, a second transparent substrate 42B having a second polarizing plate 41B and a liquid crystal layer LC interposed between the two transparent substrates 42A and 42B, as shown in FIGS. 6 and 7A. The first transparent substrate 42A and the second transparent substrate 42B are made of glass substrates, for example. And the movable barrier 40 is formed to be of normally white type that passes light when there is no electric field in the liquid crystal layer LC.

A plurality of first transparent electrodes 43 extending parallel to the first columns of pixels 10A and the second columns of pixels 10B is disposed at regular intervals on the first transparent substrate 42A. Also on the first transparent substrate 42A, there are disposed a second transparent electrode 44 isolated from the first transparent electrode 43 along one edge of each of the first transparent electrodes 43 and a third transparent electrode 45 isolated from the first transparent electrode 43 along another edge of each of the first transparent electrodes 43.

A fourth transparent electrode 46, to which a common electric potential is provided, is disposed on the second transparent substrate 42B. The first through fourth transparent electrodes 43, 44, 45 and 46 are made of transparent metal such as ITO (Indium Tin Oxide).

And the movable barrier 40 is connected with a control circuit CNT that controls applying voltage so that the liquid crystal layer LC above the first transparent electrodes 43 is rendered non transmissive and the liquid crystal layer LC above either the second transparent electrodes 44 or the third transparent electrodes 45 is rendered non transmissive as well.

When the movable barrier 40 is in the first state, the control circuit CNT controls so that the liquid crystal layer LC above the first transparent electrodes 43 and the liquid crystal layer LC above the second transparent electrodes 44 are rendered non transmissive, as shown in FIG. 7A. That is, a voltage is applied from the control circuit CNT to the first transparent electrodes 43 and the second transparent electrodes 44, while the fourth transparent electrode 46 is provided with the common electric potential. As a result, the electric field is caused in the liquid crystal layer LC above the first transparent electrodes 43 and above the second transparent electrodes 44, and alignment of liquid crystal molecules in the liquid crystal layer LC is changed along the electric field to change their optical characteristics. In the movable barrier 40, at that time, the liquid crystal layer LC above the first transparent electrodes 43 and above the second transparent electrodes 44 make light-shielding portions in the first state, and regions other than the light-shielding portions make transmissive portions 47A in the first state.

On the other hand, when the movable barrier 40 is in the second state, the control circuit CNT controls so that the liquid crystal layer LC above the first transparent electrodes 43 and the liquid crystal layer LC above the third transparent electrodes 45 are rendered non transmissive, as shown in FIG. 7B. That is, the voltage is applied from the control circuit CNT to the first transparent electrodes 43 and the third transparent electrodes 45, while the fourth transparent electrode 46 is provided with the common electric potential. As a result, an electric field is caused in the liquid crystal layer LC above the first transparent electrodes 43 and above the third transparent electrodes 45. The alignment of liquid crystal molecules in the liquid crystal layer LC is changed along the electric field to change their optical characteristics. In the movable barrier 40, at that time, the liquid crystal layer LC above the first transparent electrodes 43 and above the third transparent electrodes 45 make light-shielding portions in the second state and regions other than the light-shielding portions make transmissive portions 47B in the second state.

Positioning relationship between the display panel 10 and components in the movable barrier 40 is described hereafter. A width of each of the first and second observation regions A and B is denoted by V, as shown in FIG. 6. A moving distance of each of the first and second observation regions A and B between the first state and the second state is set to be V/2. A distance between the movable barrier 40 and either the first observation region A or the second observation region B is denoted by D. A distance between the movable barrier 40 and the display panel 10 is denoted by G. An interval of the first columns of pixels 10A as well as the second columns of pixels 10B is denoted by P.

A width of each of the second and third transparent electrodes 44 and 45 is denoted by S, as shown in FIGS. 7A and 7B. To be precise, the width S is defined as a distance from an edge of the first transparent electrode 43 to an edge of a neighboring second transparent electrode 44 or a neighboring third transparent electrode 45. The width S is a moving distance of the light-shielding portions and the transmissive portions in the movable barrier 40. R denotes an interval of sets, each of which is made of neighboring one each of the first transparent electrodes 43, the second transparent electrodes 44 and the third transparent electrodes 45. In this case, the display panel 10 and the movable barrier 40 are formed so as to satisfy a following equation (5):

$$S \leq R/4 \quad (5)$$

Figure 8A:
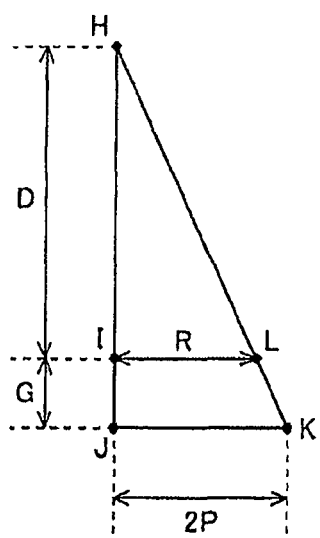
FIGS. 8A and 8B are conceptual drawings showing positioning relationship between a display panel and a movable barrier shown in FIG. 6.
Figure 8B:
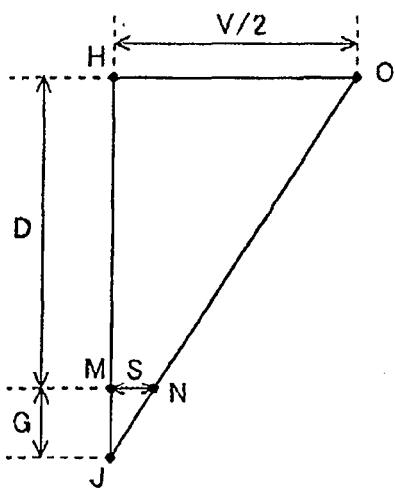

Next, how the equation (5) is derived is explained referring to the drawings. FIGS. 8A and 8B are conceptual drawings showing the positioning relationship between the display panel 10 and the movable barrier 40 shown in FIG. 6.

There is defined a triangle HJK (hereafter referred to as $\Delta$HJK) having 2P that is a sum of the interval of the first columns of pixels 10A and the interval of the second columns of pixels 10B as a base and a position H that is in the first observation region A or in the second observation region B as an apex vertically facing to the base, as shown in FIG. 8A. Also, there is defined a triangle HIL (hereafter referred to as $\Delta$HIL) having R that is the interval of the sets, each of which is composed of the first transparent electrode 43, the second transparent electrode 44 and the third transparent electrode 45, as a base and the position H as an apex vertically facing to the base.

In order for the first picture or the second picture to be observed through the transparent portions 47A in the first state of the movable barrier 40 or through the transparent portions 47B in the second state, it is necessary that the triangles $\Delta$HJK and $\Delta$HIL are geometrically similar to each other. In the case where the triangles $\Delta$HJK and $\Delta$HIL are geometrically similar to each other, a ratio of 2P to R is equal to a ratio of a length of a side HJ to a length of a side HI. And the length of the side HI is equal to the distance D, and the length of the side HJ is equal to a sum of the distance D and the distance G. That is, when the triangles ΔHJK and ΔHIL are geometrically similar to each other, an equation (6) is derived:

$$R:2P=D:(D+G) \qquad (6)$$

There is defined a triangle JHO (hereafter referred to as ΔJHO) having V/2, which is the moving distance of the first observation region A and the second observation region B, as a base and a position J, which is in the first columns of pixels 10A or in the second columns of pixels 10B, as an apex vertically facing to the base, as shown in FIG. 8B. Also, there is defined a triangle JMN (hereafter referred to as ΔJMN) having the width S as a base and the position J as an apex vertically facing to the base.

In order for the first picture or the second picture to be observed in a range of the moving distance V/2 of the first observation region A and the second observation region B, the width S needs to take a value that makes the triangles ΔJHO and ΔJMN geometrically similar to each other.

In the case where the triangles ΔJHO and ΔJMN are geometrically similar to each other, a ratio of the moving distance V/2 to the width S is equal to a ratio of a length of a side JH to a length of a side JM. And the length of the side JM is equal to the distance G, and the length of the side JH is equal to a sum of the distance D and the distance G. That is, when the triangles ΔJHO and ΔJMN are geometrically similar to each other, an equation (7) is derived:

$$S:V/2=G:(D+G) \qquad (7)$$

In order for the first picture or the second picture to be observed in the first observation region A or in the second observation region B, respectively, the display panel 10 is to be formed to satisfy an equation (8):

$$P:V=G:D \qquad (8)$$

Solving the equations (6), (7) and (8) with respect to S gives an equation (9):

$$S=R/4 \qquad (9)$$

In the above explanation, the moving distance of the first observation region A and the second observation region B has been set to V/2. However, the moving distance does not need to be larger than V/2 when the first observation region A and the second observation region B are moved to suppress the double image at the position C directly above the center of the display panel 10. That is, the moving distance is equal to or less than V/2. The equation (5) is obtained by reflecting the above in the equation (9).

Figure 9:
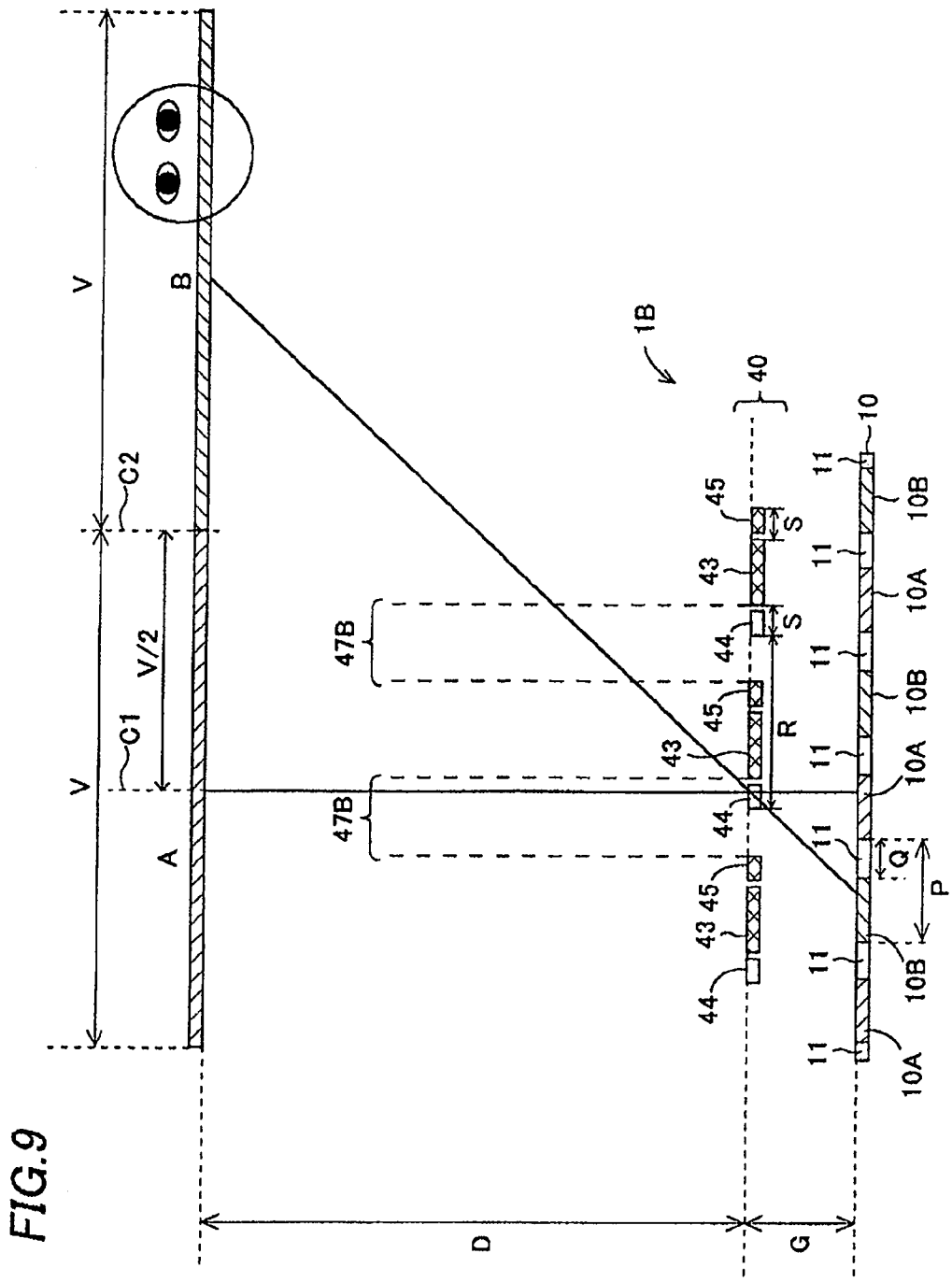
FIG. 9 is a cross-sectional view showing the display device according to the example of the second embodiment of this invention.

Next, how the structure described above works to realize the dual picture display will be explained referring to FIGS. 6 and 9. FIG. 9, like as FIG. 6, is a cross-sectional view showing the section X-X in FIG. 5. However, FIG. 9 shows the case in which the locations of the transmissive portions in the movable barrier 40 are in the second state.

At first, the first state is explained. The first observation region A is provided with the first picture from the first columns of pixels 10A through the transmissive portions 47A in the movable barrier 40 in the first state, as shown in FIG. 6. At that time, the second picture from the second columns of pixels 10B is not provided to the first observation region A because it is blocked by the light-shielding portions in the movable barrier 40, that is, the liquid crystal layer LC above the first On the other hand, the second observation region B is provided with the second picture from the second columns of pixels 10B through the transmissive portions 47A in the movable barrier 40 in the first state. At that time, the first picture from the first columns of pixels 10A is not provided to the second observation region B because it is blocked by the light-shielding portions in the movable barrier 40. As described above, there is performed the dual picture display in which the first observation region A is provided with the first picture and the second observation region B is provided with the second picture. However, the double image made of the first picture and the second picture is observed at the position C1 directly above the center of the display panel 10.

Next, the second state is explained. As shown in FIG. 9, the transmissive portions 47B in the movable barrier 40 in the second state are moved to the right compared with the transmissive portions 47A in the first state. Since the light-shielding portions in the second state are above the first transparent electrodes 43 and above the third transparent electrodes 45, they are also moved to the right compared with the light-shielding portions in the first state.

Because the first picture and the second picture passing through the transmissive portions 47B are thereby provided to the right compared with the first state, the first observation region A and the second observation region B are moved to the right by the distance V/2. That is, the position C1 directly above the center of the display panel 10 is now in the first observation region A which is provided with the first picture, and the double image as observed in the first state is no longer observed. In other words, the first observation region A and the second observation region B can be moved by switching between the first state and the second state.

Furthermore, in this embodiment, the movable barrier 40 may be controlled by the control circuit CNT so that the liquid crystal layer LC above the first transparent electrodes 43, above the second transparent electrodes 44 and above the third transparent electrodes 45 becomes transmissive in a state other than the first and second states described above. In this case, the whole movable barrier 40 works simply as a transmissive plate. At that time, by making the first picture and the second picture a common picture, a single picture display in which the single common picture is provided to both the first observation region A and the second observation region B can be performed. There is no light-shielding portion in the movable barrier 40 in this case. Thus, the single picture display can be realized without reducing brightness compared with a case in which the single picture display is realized by making the first picture and the second picture a common picture in the dual picture display state.

Figure 10A:
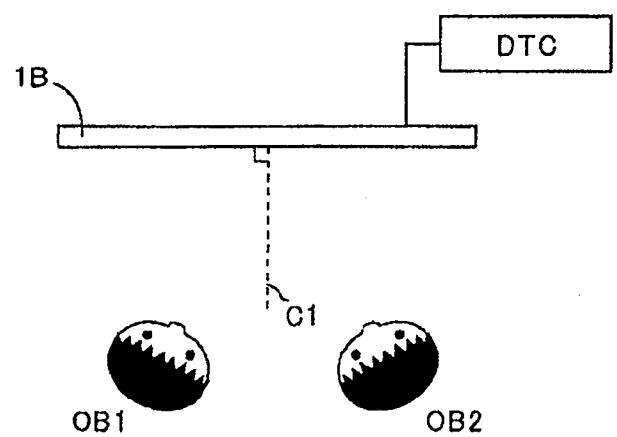
FIGS. 10A and 10B are top views showing the display device according to the example of the second embodiment of this invention.
Figure 10B:
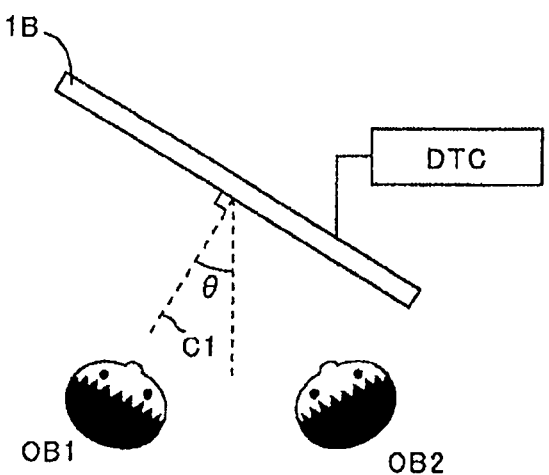

In the dual picture display described above, the first picture and the second picture can be switched arbitrarily. Instead, the first picture and the second picture may be switched automatically in response to an orientation of the display panel 10 as described below. FIGS. 10A and 10B are top views showing a display device according to the example of the second embodiment of this invention. Positioning relationship between the display device 1B and the first and second observation regions is viewed from above. FIG. 10A corresponds to the first state while FIG. 10B corresponds to the second state.

A detector DTC that detects the orientation of the display device 1B is connected with the display device 1B, as shown in FIG. 10A. Neither a first observer OB1 nor a second observer OB2 is at the position C1 directly above the display panel 10 in the first state. The first observer OB1 is in the first observation region A and observes the first picture. And the second observer OB2 is in the second observation region B and observes the second picture.

When the orientation of the display panel 10 is turned to place the first observer OB1 at the position C1 directly above the center of the display panel 10 as shown in FIG. 10B, the first observer OB1 comes to observe the double image made of the first picture and the second picture.

Thus, the detector DTC detects an angle θ corresponding to a change in the orientation of the display panel 10 to switch to the second state. And in response to a result of the detection by the detector DTC, the control circuit CNT switches from the transmissive portions 47A in the movable barrier 40 in the first to the transmissive portions 47B in the second state. At that time, the control circuit CNT controls the liquid crystal layer LC above the first transparent electrodes 43, above the second transparent electrodes 44 and above the third transparent electrodes 45 in the movable barrier 40 as described above. As a result, the first observer OB1 at the position C1 directly above the center of the display panel 10 comes to be placed in the first observation region A after changing the state and be able to observe the first picture.

Also, switching between the dual picture display and the single picture display may be executed in response to the orientation of the display panel 10. In this case, transmissiveness of the liquid crystal layer LC above the first transparent electrodes 43, the second transparent electrodes 44 and the third transparent electrodes 45 is controlled by the control circuit CNT according to the result of the detection by the detector DTC.

Figure 11A:
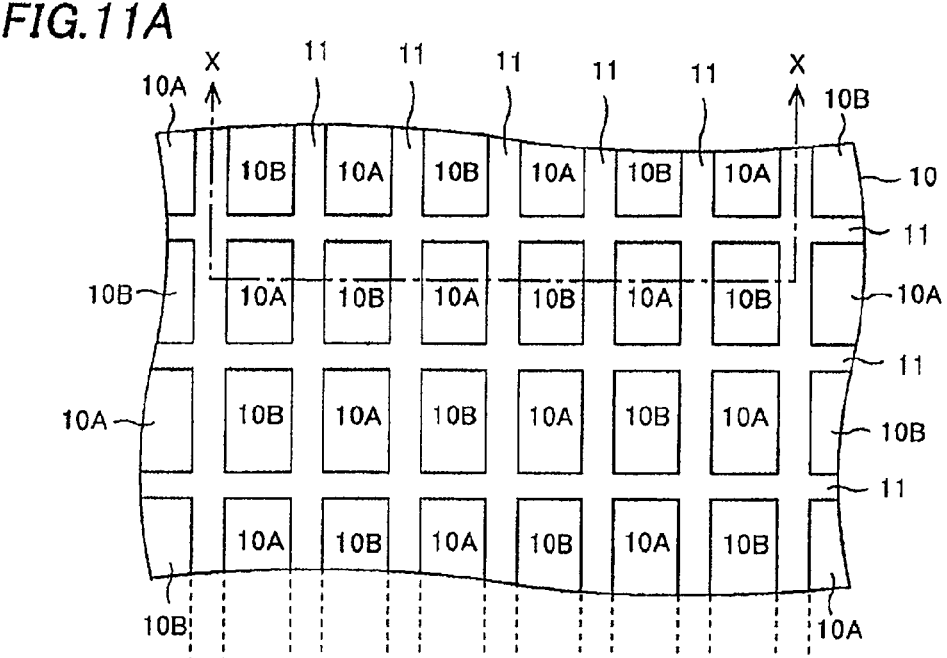
FIGS. 11A and 11B are plan views showing a display device according to another example of the second embodiment of this invention.
Figure 11B:
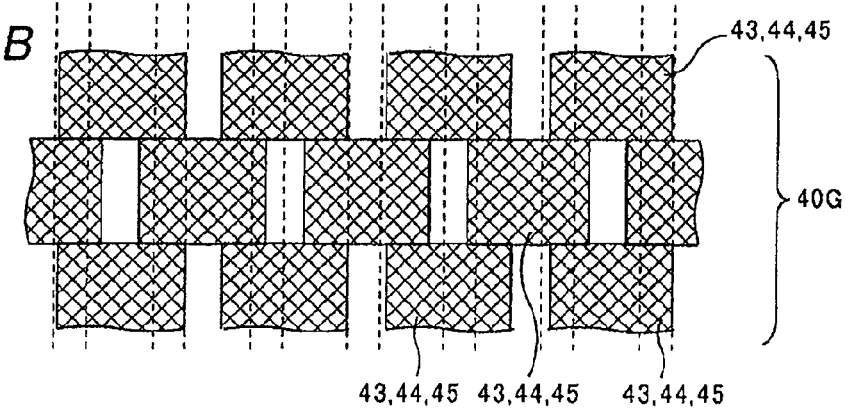

The display panel 10 and the first, second and third transparent electrodes 43, 44 and 45 are not limited to the structures shown in FIGS. 5A and 5B, and may be structured as described below, as long as they are as effective as those described above. FIGS. 11A and 11B are plan views showing a display device according to another example of the second embodiment of this invention. FIG. 11A and FIG. 11B show the display panel 10 and sets of the first, second and third transparent electrodes 43, 44 and 45 in a movable barrier 40G overlapping the display panel 10, respectively.

Pixels in the first columns of pixels 10A and pixels in the second columns of pixels 10B may be disposed alternately in every row and column, as shown in FIG. 11A. In this case, the sets of the first, second and third transparent electrodes 43, 44 and 45 and regions where no transparent electrodes are formed in the movable barrier 40G may be divided corresponding to the pixels in the first columns of pixels 10A and the pixels in the second columns of pixels 10B and disposed alternately in every row and column, as shown in FIG. 11B. Visibility of the dual picture can be thereby further improved because there are the first and second pictures existing alternately not only in terms of columns but also in terms of rows.

If there is no need for the single picture display described above, the liquid crystal layer LC above the first transparent electrodes 43 in the movable barrier 40 or 40G does not need to become transmissive in this embodiment. In this case, light-shielding layers made of non-transparent metallic or nonmetallic material that always shield light may be formed instead of the first transparent electrodes 43.

Although the movable barrier 40 or 40G is described in the embodiment as being structured so that the transmissive portions 47B in the second state is moved to the right compared with the transmissive portions 47A in the first state, the embodiment is not limited to the above. That is, the movable barrier 40 or 40G may be structured so that the transmissive portions 47B in the second state are moved to the left compared with the transmissive portions 47A in the first state.

Also, although the movable barrier 40 or 40G is described in the embodiment as being formed to be of normally white type, the embodiment is not limited to the above. That is, the movable barrier 40 or 40G may be formed to be of normally black type.

And although the movable barrier 40 or 40G is described in the embodiment as the liquid crystal barrier, the embodiment is not limited to the above. That is, the movable barrier 40 or 40G may not be the liquid crystal barrier as long as the light-shielding portions and the transmissive portions are moved so as to produce the effect as described above.

With the display devices according to the embodiments, which provide the first observation region with the first picture and the second observation region with the second picture, the double image made of the first picture and the second picture is suppressed to improve the quality of the display compared with the conventional art, when the display panel is observed from the position directly above the center of the display panel.

In addition, locations of the first observation region and the second observation region can be changed in response to the orientation of the display panel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device configured to provide a first observation region with a first picture and a second observation region with a second picture, comprising:
    a display panel comprising first pixels collectively providing the first picture, second pixels collectively providing the second picture and a black matrix defining a matrix of the first and second pixels; and
    a light-shielding plate disposed above the display panel and comprising elongated openings extending in a direction of columns of the matrix,
    wherein the following relationship is satisfied so that in a third observation region between the first observation region and the second observation region no picture is observable through the openings:

$K \leq Q \times D/(D+G)$ where D is a distance between a plane of the first and second observation regions and the light-shielding plate, G is a distance between the light-shielding plate and the display panel, K is a width of the elongated openings in the light-shielding plate, and Q is a width of the black matrix.

2. The display device of claim 1, wherein the following equation is satisfied, $P = G \times V/D$ where P is an interval of the columns of the matrix, and V is a width of the first observation region or the second observation region.

3. The display device of claim 1, wherein the light-shielding plate is configured not to lead light from the first and second pixels into a boundary between the first and second observation regions.

4. The display device of claim 1, wherein every two columns of the matrix include only the first pixels, other columns of the matrix include only the second pixels, and the elongated openings have a length enough to cover a length of the columns.

5. The display device of claim 1, wherein the first and second pixels are alternated in every column and every row of the matrix, and the elongated openings of one row is shifted in a direction of the rows with respect to the elongated openings of another row that is next to said one row.

6. A display device configured to provide a first observation region with a first picture and a second observation region with a second picture, comprising:
a display panel comprising first pixels collectively providing the first picture and second pixels collectively providing the second picture, the first and second pixels forming a matrix; and
a light-manipulating plate disposed above the display panel and comprising elongated light-passing portions extending in a direction of columns of the matrix and light-manipulation portions disposed along corresponding elongated light-passing portions, the light-manipulation portions being configured to alternate between a light shielding state and a light transmission state,
wherein the light-manipulation portions of the light-manipulating plate are configured and arranged such that in a third observation region between the first observation region and the second observation region one of the first and second pictures or no picture is observable through the light-passing portions and any light-manipulation portions that are in the light transmission state.

7. The display device of claim 6, further comprising a detector configured to detect an orientation of the display panel, wherein the light-manipulation portions is configured to change, in response to a detection by the detector, from the light shielding state to the light transmission state or from the light transmission state to the light shielding state.

8. The display device of claim 6, wherein the light-manipulating plate comprises a liquid crystal layer.

9. The display device of claim 6, further comprising a control circuit, wherein the light-manipulating plate comprises a first transparent substrate, a second transparent substrate, a liquid crystal layer interposed between the first and second transparent substrates, a plurality of first transparent electrodes disposed on the first substrate and extending in the direction of the columns of the matrix, a second transparent electrode extending along a side of each of the first transparent electrodes, a third transparent electrode extending along another side of each of the first transparent electrodes and a fourth transparent electrode disposed on the second transparent substrate, and the control circuit controls the light-manipulating plate so that the liquid crystal layer above the first transparent electrodes does not allow light to pass and the liquid crystal layer above either the second transparent electrodes or the third transparent electrodes does not allow light to pass.

10. The display device of claim 9, further comprising a detector configured to detect an orientation of the display panel, wherein the light-manipulation portions is configured to change, in response to a detection by the detector, from the light shielding state to the light transmission state or from the light transmission state to the light shielding state.

11. The display device of claim 9, wherein the control circuit controls the light-manipulating plate so that the liquid crystal layer above the first transparent electrodes, the liquid crystal layer above the second transparent electrodes and the liquid crystal layer above the third transparent electrodes allow light to pass.

12. The display device of claim 6, further comprising a control circuit, wherein the light-manipulating plate comprises a first transparent substrate, a second transparent substrate, a liquid crystal layer interposed between the first and second transparent substrates, a plurality of light-shielding layers disposed on the first substrate and extending in the direction of the columns of the matrix, a first transparent electrode extending along a side of each of the light-shielding layers, a second transparent electrode extending along another side of each of the light-shielding layers and a third transparent electrode disposed on the second transparent substrate, and the control circuit controls the light-manipulating plate so that the liquid crystal layer above the first transparent electrodes does not allow light to pass or the liquid crystal layer above the second transparent electrodes does not allow light to pass.

13. The display device of claim 12, further comprising a detector configured to detect an orientation of the display panel, wherein the light-manipulation portions is configured to change, in response to a detection by the detector, from the light shielding state to the light transmission state or from the light transmission state to the light shielding state.

14. The display device of claim 9, wherein the first and second pixels are alternated in every column and every row of the matrix, and sets of the first transparent electrodes, the second transparent electrodes and the third transparent electrodes of one row is shifted in a direction of the rows with respect to sets of the first transparent electrodes, the second transparent electrodes and the third transparent electrodes of another row that is next to said one row.

* * * * *